June 25, 1940.

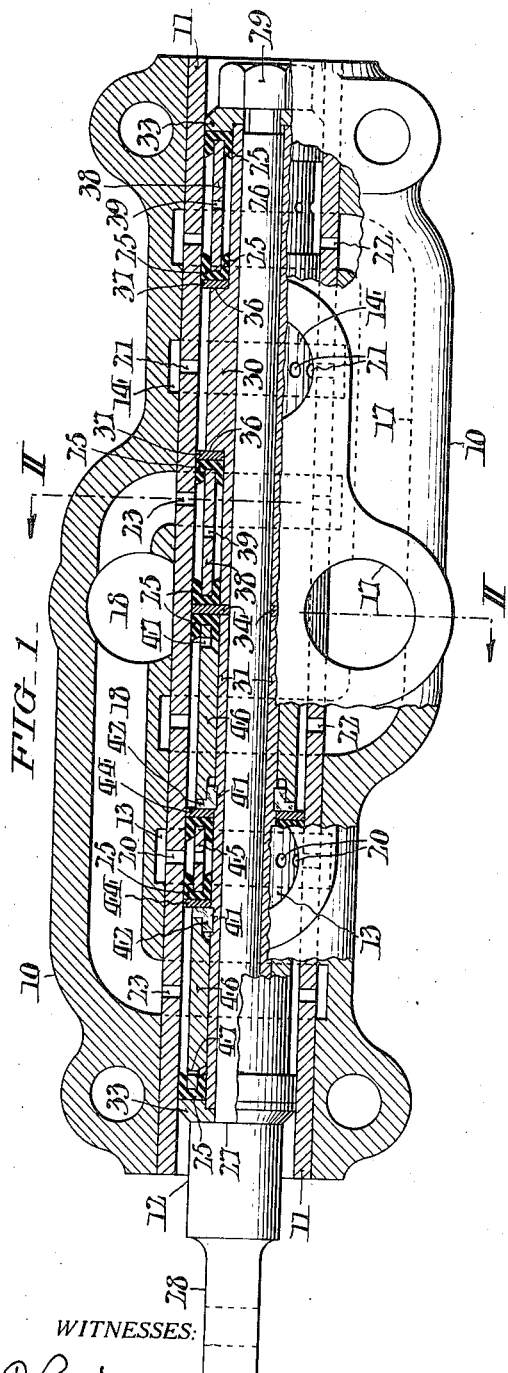

L. A. CAMEROTA 2,205,788

VALVE CONSTRUCTION

Filed Dec. 29, 1939

WITNESSES:

INVENTOR:
Louis A. Camerota,

BY

ATTORNEYS.

UNITED STATES PATENT OFFICE 2,205,788

VALVE CONSTRUCTION

Louis A. Camerota, Burlington, N. J., assignor to Florence Pipe Foundry & Machine Company, Florence, N. J., a corporation of New Jersey Application December 29, 1939, Serial No. 311,506

6 Claims. (Cl. 251—76)

This invention relates to valve construction that is suitable, especially, for valves of piston type. The invention facilitates the construction and assembly of such a valve, and is of special advantage for assuring fluid-tightness of the valve in its seat or bore. In the case of valves with elastic or flexible packings,—as of rubber or leather or the like—the invention allows of holding such packings accurately and firmly in position, without any danger of over-compressing or cutting the packing, and it facilitates replacement of packings when worn or impaired in any way. The construction may also be found advantageous in cases where packing rings of inelastic nature (such as metal rings) are used. The invention is very useful for control or manipulator valves that admit high pressure fluid to the operating or power cylinders of hydraulic presses or the like, and also vent or exhaust the spent fluid, and is here illustrated and explained in connection with such valves.

Other features and advantages of the invention will appear from the following description of species and forms of embodiment, and from the drawings. All the features and combinations shown or described are, indeed, of my invention, so far as novel.

In the drawings,

Fig. 1 shows a valve casing with a piston valve therein embodying the invention, both the casing and the valve proper being partly in elevation and partly in longitudinal section.

Fig. 2 shows a cross-section through the valve and its casing, taken as indicated by the line and arrows II—II in Fig. 1.

Fig. 3 is an exploded perspective view of a split ring that appears in section in Fig. 1.

Figure 4:
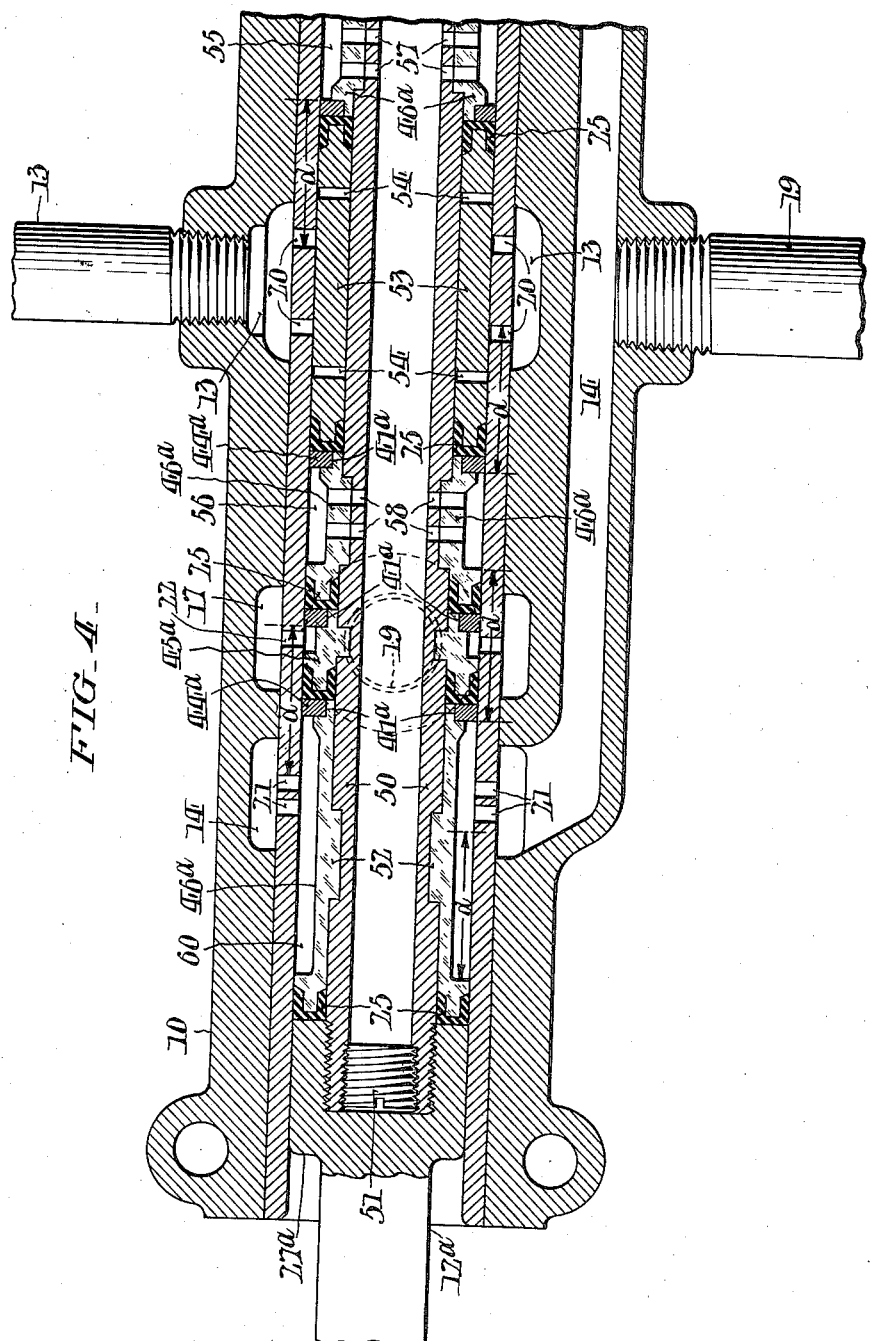
Fig. 4 shows a longitudinal section through slightly more than one-half of a valve embodying the invention in a different form.

The valve shown in Figs. 1 and 2 comprises a casing 10 having a cylindrical liner 11, forming the valve-bore or seat, and also a piston valve 12 movable longitudinally in the bore. This valve 12 comprises a number of piston heads which, according to the longitudinal position of the valve in its bore 11, either intervene between adjacent sets of ports in the liner 11, to prevent communication between them, or include two such adjacent sets of ports between adjacent piston heads, thus permitting such intercommunication. In the casing 11 are formed passages 13, 14 for connection to motive fluid supply and exhaust pipes (only the supply pipe 15 being shown, Fig. 2) and also passages 17, 18 that are intended to be connected to the opposite ends of the power cylinder (not shown) that is controlled by the valve 12, as by means of pipes 19, 19, Fig. 2. As shown in Fig. 2, the casing has duplicate openings for the pipes 15, 19, 19, and the unused openings are closed by plugs 115, 119, 119. The motive fluid may be any suitable elastic or inelastic fluid under adequate pressure, such as oil or water. As shown, the supply passage 13 extends around an annular row of admission ports 20 that open through the liner 11, and the exhaust passage 14 extends around a similar set of exhaust ports 21. Each of the cylinder passages 17, 18 leads to two annular sets of ports 22 and 23 that open through the liner 11.

In its normal mid-position here shown, the valve 12 cuts off each of the cylinder ports 22, 23 from both the admission ports 20 and the exhaust ports 21; when moved to the left of this mid-position, the valve 12 connects the left-hand set of cylinder ports 22 and one end of the power cylinder (not shown) to the admission ports 13, and connects the right-hand set of cylinder ports 23 and the other end of the power cylinder to the exhaust ports 21; and when moved to the right of this mid-position, the valve 12 reverses the admission and exhaust connections as between the two ends of the power cylinder, by connecting the left-hand set of cylinder ports 23 to the admission ports 13, and the right-hand set of cylinder ports 22 to the exhaust ports 21.

It is with the construction of the valve 12 to fix its piston heads at the desired relative positions and to make them fluid-tight in the valve-bore 11 that my invention is specially concerned.

As here shown, the valve 12 comprises a body with annular packings forming the piston-heads, each including an elastic or flexible packing ring 25 to make sealing contact with the interior of the valve-bore 11, and, preferably, an associated inelastic (metal) backing-ring. In the present instance the valve body is of built-up construction, comprising a central rod or spindle 26 shouldered at 27 adjacent its apertured operating stem portion 28, and threaded at its other end to take a clamping nut 29, and a couple of sleeves 30, 31 fitting snugly (but not tightly) on said stem. Against the stem shoulder 27 and the nut 29 are clamping and backing rings or washers 33, 33, which abut against the ends of the sleeves 30, 31 and have annular centering shoulders that engage around these sleeves. Between the adjacent ends of the sleeves 30, 31 intervenes a spacing and backing washer 34, which may be of sufficient thickness to assure tightness of the parts 33, 30, 34, 31, 33 between shoulder 17 and nut 29 when the latter is tightened up.

As here shown, the sleeve 30 has its midportion enlarged to afford annular shoulders 36, 36 facing the shoulders afforded by the washers 33, 34. Around the sleeve 30 against these shoulders 36, 36 are backing rings or washers 37, 37. With each of the backing rings 33, 37, 37, 34 is associated one of the "cup" packing rings 25, each of which is here shown as a trough-like annulus of U-section with the convex back of the U against the washer. In other words, the packing rings 25, 25 are arranged concave-to-concave in pairs. On the sleeve 30 between each such pair of the packing rings 25, 25 is shown a spacing sleeve member 38 (apertured at 39 for purposes of pressure equalization), with its ends engaged in the concaves of the packing rings. Thus on this right-hand end of the valve 12, the elastic or flexible packing rings 25 with their associated backing rings 33, 36, 36, 34 are held firmly between the parts 33 and 34, with a tightness or degree of compression determined by the proportions of the parts,—a compression which may, if desired, be different for the two pairs of packings 25, 25.

As here shown, the sleeve 31 is of uniform size, without any enlargement like that of the sleeve 30, but is peripherally recessed at 41, 41 to receive and engage corresponding portions of split annular members, rings, or collars 42, 42, which afford shoulders against which abut backing rings or washers 44, 44 for the packings 25, 25 associated with these annular members 42, 42. As here shown, the sleeve recesses 41, 41 have the form of continuous annular grooves, and the annular members 42, 42 are externally reduced or rabbetted at their sides or ends remote from said washers 44, 44. Between the washer 44, 44 are two of the packing rings 25, 25, arranged concave-to-concave with an interposed apertured spacing sleeve member 45 (similar to the spacing sleeves 38) having its ends engaged in their concaves. On the sleeve 31, against the backing washers 33, 34 at its opposite ends, are packing rings 25, 25; and between each of these and the adjacent split ring 42 is a spacing sleeve 46 whose ends are of such size as to allow them to engage in the concave of the packing 25 and around the reduced shoulder of the split ring 42, but whose intermediate portions are preferably of an internal diameter to fit snugly (but not tightly) around the sleeve 31. In other words, the ends of the spacing sleeves 46 are internally reduced or rabbetted. Through the reduced end of each sleeve 46 adjacent the packing 25 there may be pressure-equalizing holes 47.

It will be seen, therefore, that on this lefthand end of the valve 12, the elastic or flexible packing rings 25 with their associated backing rings 33, 44, 44, 34 are held firmly with a determined tightness or compression, just like those on the right-hand end of the valve. Also, the split rings 42, 42 are held together on the valve body sleeve 31 by their engagement endwise inside the spacing sleeves 46, and are thereby held engaged in the grooves 41 of this sleeve 31. The valve-body with its shoulder 27 and the nut 29 coact to hold together in endwise engagement the packing-rings 25, spacing-sleeves 46, and split rings 42. The locations of the annular grooves 41 determine the tightness or degree of compression of the packing rings 25.

It will be understood that in practice the metal backing rings 33, 34, 36, 44, are preferably made enough smaller than the valve bore 11 to assure clearance, yet large enough to sustain the cup-packings or rings 25 against any fluid pressure to which they are subjected at their concave sides. Thus only the packings 25 make contact with the valve bore 11, and wear is confined to them.

The valve and valve body shown in Fig. 4 are generally similar to those in Fig. 1, and their corresponding parts are marked with the same reference numerals, as a means of dispensing with repetitive description,—a letter being added where such distinction appears necessary. The drawing shows only a little more than half of the valve-body, since its other end may be just like that shown. As here shown, the valvebody consists of a single annularly grooved sleeve 50, whose ends are closed fluid-tight in any suitable way, as by plugs 51 screwed into them. The valve stem 27a and a clamping nut (not shown, but corresponding essentially to the nut 29 in Fig. 1) are screwed on the opposite ends of this valve-body sleeve 50. In this instance, the split annular members are the spacing sleeves 46a, 45a, 46a, and their reduced or rabbetted ends engage in the backing washer or ring members 44a, which hold them together engaged in the valve-body recesses or grooves 41a. For this purpose, the split annular members 46a have internal projections or annular ridges 52. The middle spacing sleeve 53 need not be split, but has pressure-equalizing holes 54 therethrough.

The annular valve-spaces 55, 56 around the two spacers 46a nearest this middle sleeve 53 communicate with the interior of the valve-body 50 through radial ports 57, 58 in said spacers 46a and in the valve body 50 itself; but with the valve 12a in mid-position, the left-hand cylinder ports 22 (as well as the corresponding right-hand cylinder ports, not shown) are cut off from both pressure and exhaust,—as are also these annular valve-spaces 55, 56.

Movement of the valve 12a a distance d to the left from its mid-position in Fig. 4 brings the annular valve-space 55 opposite the pressurefluid admission ports 20 and the annular valvespace 56 opposite the left-hand cylinder ports 22, so that motive fluid can pass through the interior of the valve body 50 and the left-hand pipe 19 to one end of the power cylinder (not shown). Such movement of the valve 12a to the left also brings the right-hand annular-valve space (not shown) corresponding to the space 60 in Fig. 4 opposite the right-hand cylinder ports (not shown) corresponding to the ports 22 in Fig. 4, as well as opposite the right-hand exhaust ports (not shown) corresponding to the ports 21 in Fig. 4, thus venting the other end of the power cylinder. In a similar manner, movement of the valve 12a a distance d to the right from its mid-position in Fig. 4 brings the annular valve space 55 opposite the pressurefluid admission ports 20 and supplies motive fluid to the last-mentioned "other" end of the power cylinder, and also brings the annular valve space 60 opposite the cylinder-ports 22, venting the corresponding end of the power cylinder.

The splitting of the parts in Figs. 1 and 4 makes it possible to assemble the various sleeves, rings, and packings of the piston valve on the valve body without having the packings 25 themselves split, thus assuring fluid-tightness of the piston heads in the valve-bore, and at the same time fixing the positions of the parts of the valve body (and the compression of the packings 25) definitely and correctly by positive engagement of the split members with the valve body. Also, the packings 25 can be very easily replaced whenever they are worn or otherwise impaired in any way. Preferably, the split annular members 42 in Fig. 1 or 46a, 45a in Fig. 4 are not merely split at one side (like an ordinary lock-washer or a piston-ring), but are actually divided into separate halves, as shown in Fig. 3.

Having thus described my invention, I claim:

1. A piston valve having a multiplicity of piston heads for cooperating with a ported valve bore to establish or prevent communication between ports spaced apart lengthwise of said bore, according to the lengthwise position of the valve in the bore; said piston valve comprising a peripherally recessed valve body; annular packing around said valve body, forming a piston head thereof, and an associated annular member; and a split annular member around said valve body engaged in the aforesaid annular member and held together thereby in shouldered engagement with the peripherally recessed valve body, whereby the positions of the first-mentioned annular member and of said packing relative to said valve body are determined.

2. A piston valve having a multiplicity of piston heads for cooperating with a ported valve bore to establish or prevent communication between ports spaced apart lengthwise of said bore, according to the lengthwise position of the valve in the bore; said piston valve comprising a peripherally recessed valve body; annular packings around said valve body, forming piston heads thereof, and associated annular members; split annular members around said body engaged in the aforesaid annular members and held together thereby in shouldered engagement with the peripherally recessed valve body; and means for preventing separation of said split annular members and the other annular members lengthwise of said valve body.

3. A piston valve having a multiplicity of piston heads for cooperating with a ported valve bore to establish or prevent communication between ports spaced apart lengthwise of said bore, according to the lengthwise position of the valve in the bore; said piston valve comprising an annularly grooved valve body; packing rings around said valve body, forming piston heads thereof; and a spacing sleeve member and an associated ring member around said body between said packing rings, one of said members being split and engaged in the other, and thus held together in engagement in the groove of said body, whereby the positions of said members and of said packings relative to said valve body are determined.

4. A piston valve having a multiplicity of piston heads for cooperating with a ported valve bore to establish or prevent communication between ports spaced apart lengthwise of said bore, according to the lengthwise position of the valve in the bore; said piston valve comprising a peripherally recessed valve body; annular elastic packing around said body, forming a piston head thereof; split annular members around said body at opposite sides of said elastic packing; and rings around said body and said split annular members holding the latter together in shouldered engagement with the peripherally recessed valve body, whereby the position and compression of said packing is fixed.

5. A piston valve having a multiplicity of piston heads for cooperating with a ported valve bore to establish or prevent communication between ports spaced apart lengthwise of said bore, according to the lengthwise position of the valve in the bore; said piston valve comprising an annularly grooved valve body; elastic packing rings and an interposed spacing sleeve around said body; split annular members around said body at opposite sides of said elastic packing rings; and other rings around said body and said split annular members holding the latter together engaged in grooves aforesaid of the body, whereby the positions and compression of said packing rings are fixed.

6. A piston valve having a multiplicity of piston heads for cooperating with a ported valve bore to establish or prevent communication between ports spaced apart lengthwise of said bore, according to the lengthwise position of the valve in the bore; said piston valve comprising an annularly grooved valve body; elastic packing rings around said body; an annular member around said body between said elastic packing rings; and a split ring around said body engaged in said annular member and held together thereby in engagement in a groove aforesaid of said body, whereby the positions of said packing rings relative to said valve body are determined.

LOUIS A. CAMEROTA.